F. R. JONES.
GEAR CUTTING MACHINE.
APPLICATION FILED NOV. 16, 1920.
1,438,529.
Patented Dec. 12, 1922.
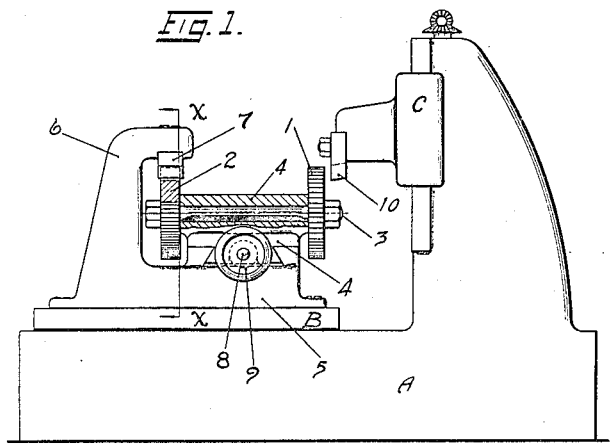
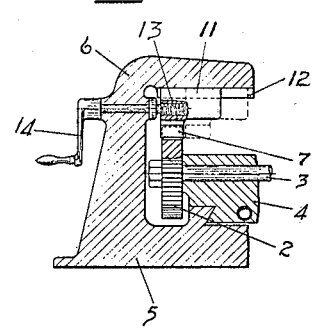
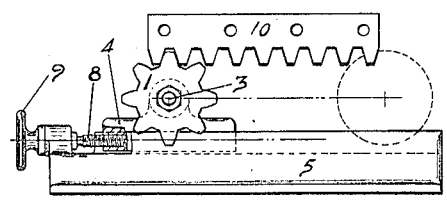
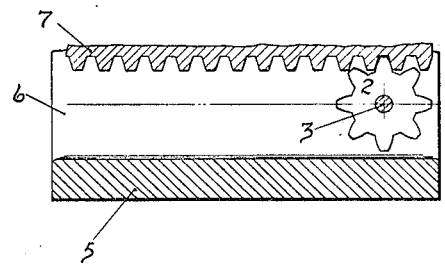
INVENTOR Patented Dec. 12, 1922.

1,438,529

UNITED STATES PATENT OFFICE.

FORREST R. JONES, OF KNOXVILLE, TENNESSEE.

GEAR-CUTTING MACHINE.

Application filed November 16, 1920. Serial No. 424,570.

*To all whom it may concern:*

Be it known that I, FORREST R. JONES, a citizen of the United States, residing at Knoxville, in the county of Knox and State of Tennessee, have invented new and useful Improvements in Gear-Cutting Machines, of which the following is a specification.

This invention relates to the cutting of gears by a generative method in which the gear blank and cutter having rolling motion relative to each other. The cutter may be either of the rack-type or have only a single cutting end.

The object is to provide means of few parts and simple constructive form, thus eliminating complicated mechanism with its inherent sources of error, due to such causes as inaccuracies of construction, elastic yielding, wear and lost motion, or play.

Although the device of this invention is shown and described as an accessory to a well-known type of metal-working planer, the device can be readily constructed as a machine complete in itself; and it is understood that the device can also be used equally well by fastening it to the stationary table of an ordinary metal-working shaper, in which case the cutting tool will have a reciprocating movement relative to the frame of the shaper.

In the drawings:

Fig. 1 is an outline side view of an ordinary metal-working planer upon whose reciprocating table is mounted the novel device of this application; the cutting tool is carried by the crossrail of the planer.

Fig. 2 is an elevation, looking toward the left in Fig. 1, of the cutter, a blank nearly completely cut, and the lower part of the device.

Fig. 3 is a sectional view on the plane XX of Fig. 1, looking toward the left, as indicated by the arrowheads, showing the relative positions of the gear and rack. And Fig. 4, is a modification of the device illustrating the method of indexing the gear blank so that more teeth can be cut in it than there are cutting ends in the cutter. This figure is partly a sectional view of the device of Fig. 1, on a vertical plane through the axis of the spindle which carries the gear blank.

Referring to Figs. 1, 2 and 3: The gear blank 1 to be cut, and a gear 2, are both mounted rigidly on the spindle 3 rotatively mounted on the saddle 4 which is slidably mounted on the base 5. The base is rigidly fastened to the planer table B. A broad flange-like arm 6, integral with the base 5, extends upward from the base 5 and has, rigidly fastened to its upper part, a rack 7 which meshes with the gear 2.

The saddle 4 can be moved along the slides of the base 5, by rotating the screw 8 to which is fastened the handwheel 9.

The sliding of the saddle 4 along the base 5 causes the gear 2 to roll along the rack 7. The gear blank 1 is thus caused to have a correct rolling motion relative to the cutter. The cutter 10 is rigidly fastened to the cross-rail C of the planer, and does not move relative to the frame A of the planer.

The above described rolling motion of the gear 2 therefore causes the gear blank to have a rolling motion relative to the cutter exactly the same as that of the gear and rack relative to each other, when the planer table is not moving relative to the cutter. By giving the planer table B its ordinary reciprocating motion so as to bring the cutter into action upon the gear blank, and at the same time feeding the saddle along the base, the cutter is caused to cut out spaces in the gear blank so as to leave gear teeth.

The dotted circle in Fig. 2, indicates the position of the blank when cutting has progressed slightly, and by the time the blank 1 has rolled to its full-line position, as shown by full lines near the left hand end of the cutter, Fig. 2, the cutting of the blank is nearly completed.

If the cutter has an many cutting ends as the gear blank is to have teeth, then each cutting end will cut a corresponding tooth space in the blank while the latter is rolling from the position at which cutting begins at one end of the cutter, to the position at which cutting is just completed at the opposite end of the cutter.

But if there is a less number of cutting ends in the cutter than the required number of teeth to be cut in the gear blank, or if only a few of the cutting ends are to be used, then, after some of the teeth have been cut and others partly cut, the blank must be moved back, without rotation, or with only a slight rotative movement, toward the end of the cutter at which the cutting first began. In order to accomplish the shifting back of the blank without rotation, the rack 7 must be disengaged from the gear 2, during the shifting movement. This disengagement is accomplished by the following means.

Fig. 4 shows the rack 7 integral with a sliding bearing 11 which fits into a corresponding slide 12 in the upper end of the arm 6. The rack can be slid toward the right out of engagement with the gear 2, by rotating the screw 13. The hand-crank 14 can be used for effecting this rotation of the screw.

The following method can be used for cutting more spaces in a gear blank than there are cutting ends in the cutter.

First roll the blank along the cutter until one or more spaces are completely cut; other spaces will then be partly cut. Stop the reciprocating motion of the planer table so that the cutter is free of the gear, as in Fig. 1. Slide the rack toward the right in Fig. 4, to its dotted line position out of mesh with the gear 2. Then slide the saddle back toward the initial cutting end of the cutter, without rotation of the gear and blank, through a distance equal to, or approximately equal to, the spacing of the cutting ends of the cutter, or to a multiple of the spacing of the cutting ends. Finally slide the rack again into mesh with the gear. The partly-cut blank is thus brought into correct position for continuing the cutting operation.

If the saddle 4 is moved back, as just described, through a distance exactly equal to the spacing, or to a multiple of the spacing, of the rack teeth and of the cutting ends, then the rack can be slid into mesh with the gear without giving the latter any rotation, and a different cutting end from that which partly cut a given one of the tooth spaces, will be brought to a position such that, at the first stroke of the planer table, this different cutting end will pass through the given partly cut tooth-space in exactly the same position, relative to the tooth space, as the cutting end which partly cut the given space did during the last cutting stroke made just before the saddle was slid back.

No material will be removed from the gear blank during the planer table's first stroke after sliding the rack into mesh with the gear in the manner just described.

It is a notable feature of the device however that it is not necessary to move the saddle back by an exact distance equal to the tooth spacing of the rack, or by a multiple thereof. For, if the saddle is moved back by a distance slightly greater or less than the tooth spacing of the rack, then a corresponding slight rotative movement of the gear will bring it into position for the rack teeth to slide into mesh with it. If the adjacent ends of the gear teeth and rack teeth are given a wedge-like shape, such as commonly used in the sliding gear of automobile transmissions, then the rack will readily slide into mesh with the gear, at the same time giving the latter the required slight rotative movement.

In view of the above, it is evident that, in the above method it is not necessary when indexing for the screw 8 to have a uniform lead, or for its rotation to be the same in amount for each feed movement, neither is it necessary when indexing to stop the saddle at any exact position at the end of its feed movement, or to bring the saddle back to an exact position at the end of its return movement.

What I claim is:

1. In a gear cutting machine, the combination of a cutter, a generating gear meshed with a rack, means to feed a gear-blank relative to the cutter, means to reciprocate the gear-blank and cutter relative to each other, and means to disengage and re-engage the gear and rack by moving the rack in a direction perpendicular to the length of the rack.

2. In a gear cutting machine, the combination of a cutter, a generating gear meshed with a rack, means to feed a gear-blank relative to the cutter, means to reciprocate the gear-blank and cutter relative to each other, and means to move the rack from engagement with the gear while the gear-blank remains stationary.

In testimony that I claim the foregoing as my invention I have signed my name in presence of two subscribing witnesses.

FORREST R. JONES.

Witnesses:
SIDNEY BIRKNER,
JOHN PUNKRATZ.